United States Patent
Collison

(10) Patent No.: US 10,082,415 B1
(45) Date of Patent: Sep. 25, 2018

(54) FLOATING EVAPORATION PAN WITH ADJUSTABLE FREEBOARD AND SURROUNDING WAVE-GUARD

(71) Applicant: Jacob William Collison, Albuquerque, NM (US)

(72) Inventor: Jacob William Collison, Albuquerque, NM (US)

( * ) Notice: Subject to any disclaimer, the term of this patent is extended or adjusted under 35 U.S.C. 154(b) by 43 days.

(21) Appl. No.: 15/081,517

(22) Filed: Mar. 25, 2016

(51) Int. Cl.
*G01F 23/30* (2006.01)
*G01W 1/00* (2006.01)

(52) U.S. Cl.
CPC ............ *G01F 23/303* (2013.01); *G01W 1/00* (2013.01)

(58) Field of Classification Search
CPC ............................. G01F 23/303; G01W 1/00
USPC ......................................... 73/61.41
See application file for complete search history.

(56) References Cited

U.S. PATENT DOCUMENTS

| | | | | |
|---|---|---|---|---|
| 4,967,789 A * | 11/1990 | Kypris | ................ | A01G 25/167 137/413 |
| 6,233,953 B1 * | 5/2001 | Schill | ................ | F25C 1/142 62/135 |
| 7,162,923 B1 * | 1/2007 | Masoner | ................ | G01W 1/00 73/290 R |
| 8,490,566 B1 * | 7/2013 | Shivers, III | ............ | B63B 27/30 114/230.14 |
| 2012/0079971 A1 * | 4/2012 | Stock | ...................... | B01D 1/14 110/250 |

OTHER PUBLICATIONS

Masoner, et al., "A Comparison of Methods for Estimating Open-Water Evaporation in Small Wetlands", Wetlands, vol. 30, 2010, 513-524.
Masoner, et al., "Differences in Evaporation Between a Floating Pan and Class A Pan on Land", Journal of the American Water Resources Association, vol. 44, No. 3, Jun. 2008, 552-561.

* cited by examiner

*Primary Examiner* — Son Le
*Assistant Examiner* — Marrit Eyassu
(74) *Attorney, Agent, or Firm* — Isaac Estrada; Peacock Law P.C.

(57) ABSTRACT

An improved evaporation pan assembly and measurement method comprising adjustable buoyancy floats attached to an outer wave-guard that surrounds the evaporation pan. An anchor system preferably restricts lateral movement while allowing for vertical movement with changing fluid levels. Preferably, the evaporation pan assembly further comprises a baffle system within the evaporation pan to prevent sloshing of the fluid within the pan. The height of the body of fluid being evaluated is preferably measured with a guided float assembly within the evaporation pan.

13 Claims, 2 Drawing Sheets

FLOATING EVAPORATION PAN WITH ADJUSTABLE FREEBOARD AND SURROUNDING WAVE-GUARD

STATEMENT REGARDING FEDERALLY SPONSORED RESEARCH OR DEVELOPMENT

Not Applicable.

BACKGROUND OF THE INVENTION

Field of the Invention (Technical Field)

Embodiments of the present invention relate in general to methods and apparatuses for measuring evaporation rates for a fluid within a body of fluid, and more particularly to methods and apparatuses that carry out such measurement through a floating evaporation pan within the larger body of the fluid of interest.

Description of Related Art

Knowing the amount of evaporation from a body of fluid is critical for its proper management. Typically, the largest unknown in the management of large bodies of fluid (e.g., lakes and reservoirs) is the amount of fluid lost to evaporation. There are many methods of measuring the evaporation rate, each with its own advantages and disadvantages, with the most common method being a land-based evaporation pan. Under normal operation conditions, a land-based evaporation pan is situated near a large body of fluid, elevated above the ground on a wooden platform, and the fluid-level within the pan is measured periodically to determine the evaporation rate.

There are several problems associated with obtaining accurate evaporation rates using a land-based evaporation pan. Due to the pan being placed on land, the fluid temperature within the pan could be far greater than the fluid temperature in the larger fluid body being evaluated, causing evaporation to be overestimated. The higher evaporation rates within a land-based pan are due in part to the increased advection of heat energy through the metal, sun-exposed sides of the land-based pan, which increases the temperature of the fluid in the land-based pan. Additionally, the land-based pan has a substantially smaller boundary layer than a large fluid body (e.g., a reservoir or lake) that is in the range of tens of centimeters for the land-based pan compared to hundreds of meters for the large fluid body. Since both boundary layers go from saturation vapor pressure at the surface of the fluid to ambient vapor pressure at the top of the boundary layer, the land-based pan has a much steeper vapor pressure gradient within that layer, resulting in greater evaporation from the land-based pan.

There is a known method developed to overcome the problems with evaporation measurement with land-based pans in which an adjustable floating open-water evaporation pan is used. The pan floats in the body of fluid being measured. By putting the pan in the body of fluid being measured, the increased advection of energy through the sides of the pan is greatly reduced and the atmospheric boundary conditions in the evaporation pan closely resemble that of the surrounding fluid body. This floating evaporation pan works well in environments where there is only minor wave action, such as wetlands, small ponds, and/or lagoons. Wave action can have two major adverse impacts on the height of the fluid within the pan: 1) wind or human generated waves can overtop the side of the evaporation pan adding fluid to the pan; and, 2) wind or human generated wave action can cause a sloshing disturbance within the pan where fluid within the pan can overtop into the surrounding body of fluid. In both cases, the measurement of evaporation within the pan is now invalid for the time period where fluid was added or removed, reducing the reliability of the floating evaporation pan.

There is a long felt need for apparatuses and methods to obtain more accurate and reliable evaporation rate readings in large, open bodies of fluids where there is wind or human generated wave action. Embodiments of the present invention solve this problem by providing methods and apparatuses that more accurately measure evaporation rate.

BRIEF SUMMARY OF THE INVENTION

Embodiments of the present invention comprise a floating evaporation pan that has adjustable buoyancy floats attached to an outer wave-guard surrounding the evaporation pan. In one embodiment, in addition to the surrounding wave-guard, there is a full-circumference splash guard attached to the outer-top of the evaporation pan. Furthermore, within the pan there preferably is a baffle system that reduces fluid sloshing. Lastly, the freeboard (the distance from the surface of the fluid to the top of the apparatus) of the pan can be adjusted with the adjustable buoyancy floats so that the fluid level within the pan can be slightly lower than the fluid level of the surrounding body. The addition of the outer wave-guard surrounding the evaporation pan, a full-circumference splash guard, the baffle system within the evaporation pan, and the fluid level within the pan being lower than the surrounding fluid enhance the accuracy and reliability of evaporation measurements for the embodiments of the present invention.

Accordingly, it is the objective of the present invention to provide an improved evaporation pan assembly that allows for more accurate and reliable evaporation rate calculations than current land-based or floating evaporation pans.

The embodiments of the present invention meet the objective for more accurate and reliable evaporation rate measurements in large, open bodies of fluid with the incorporation of techniques and methods that greatly reduce the disturbance of evaporation measurements from wave action. There preferably is a wave-guard equally spaced between the buoyancy floats, which deflects the energy of waves away from the floating evaporation pan. The wave-guard and buoyancy floats preferably surround the evaporation pan at equal distances and provide an area of calm fluid adjacent to the evaporation pan. By allowing for this area of calm fluid between the wave-guard and the pan, the overall width of the apparatus is increased, reducing the rocking motion of the invention. The reduction of rocking motion of the apparatus further prevents fluid from being added or removed from within the evaporation pan. The baffle system within the evaporation pan dampens sloshing created by the rocking of the apparatus. Preferably surrounding the evaporation pan is a structural brace that preferably serves as an exterior splash guard. An anchoring system is preferably also present to prevent rotation and movement of the apparatus in a large body of fluid. This anchoring system preferably prevents the lateral movement of the apparatus while allowing for vertical movement to accommodate for changing fluid elevation of the larger body of fluid. The fluid level within the evaporation pan is preferably maintained slightly lower than that of the surrounding body of fluid by use of a pump that is controlled by a guided-float within the evaporation pan. The sun-exposed sides of the evaporation pan preferably absorb energy from the sun, heating up the sides. This increased energy is preferably dissipated into the surrounding fluid body before it is dissipated to the fluid within the evaporation pan due to the slightly higher body of fluid level surrounding the evaporation pan. The freeboard of the wave-guard is preferably controlled with the adjustable buoyancy floats through the addition of weight (fluid, sand, gravel, etc.) to the buoyancy floats. Once the proper freeboard is established for the apparatus, the remaining hollow in the buoyancy floats is preferably filled with expanded polystyrene. The addition of the expanded polystyrene preferably prevents the invention from sinking even if the buoyancy floats are punctured. These techniques and methods significantly increase the reliability of evaporation rate measurements providing for an extremely accurate measurement of the evaporation rate within the body of fluid being evaluated.

Further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

Figure 1:
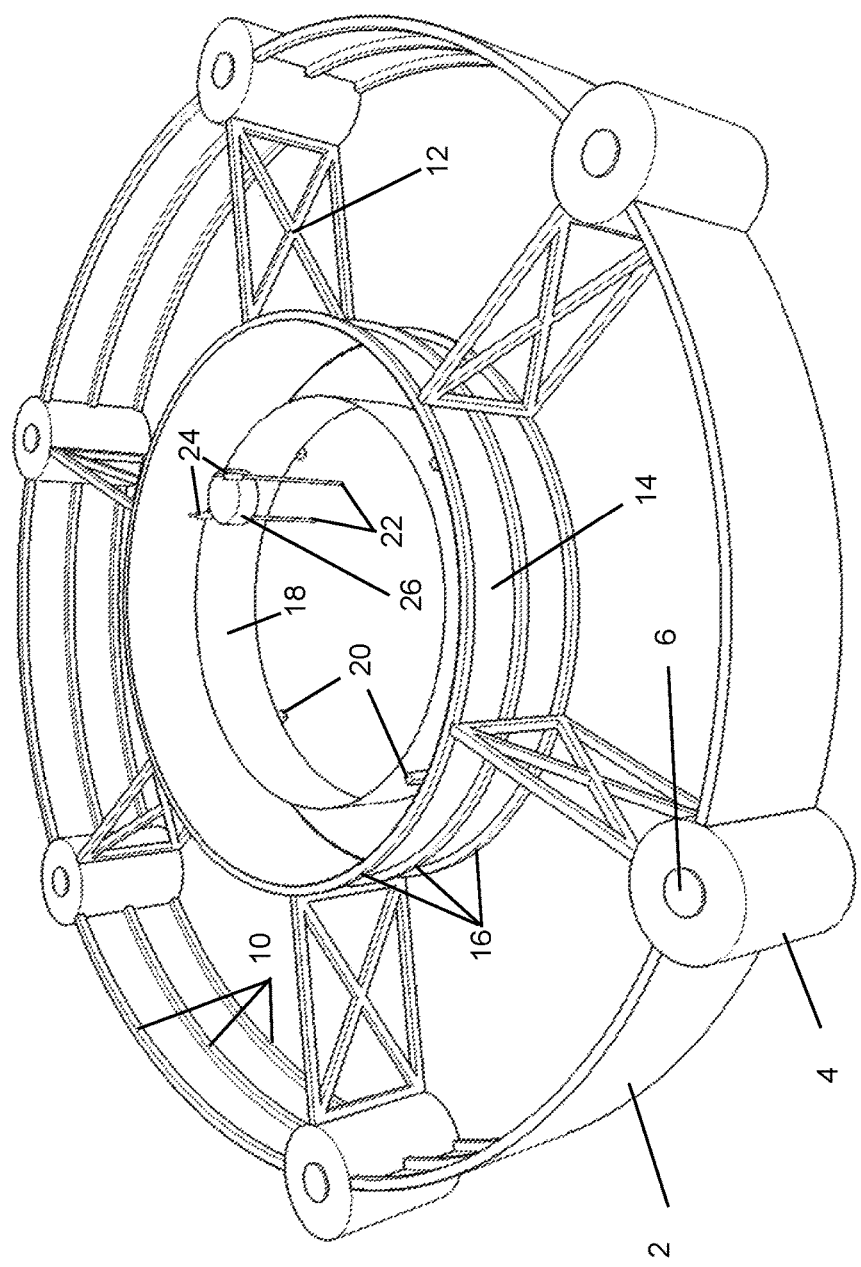
FIG. 1 is a perspective view of an embodiment of the present invention.

In the following detailed description, numerous specific details are set forth in order to provide a thorough understanding of the embodiments of the invention. However, it will be understood by one of ordinary skill in the art that the embodiments may be practiced without these specific details. For instance, well known operation or techniques may not be shown in detail. Technical and scientific terms used in this description have the same meaning as commonly understood to one of ordinary skill in the art to which this subject matter belongs.

Embodiments of the invention comprise an improved floating evaporation pan assembly that has built-in protections from wave action. An open-body container (hereinafter "evaporation pan") is preferably surrounded by a wave-guard, preventing wave action disturbance of evaporation rate measurements to improve the reliability of said measurements. One embodiment of the wave-guard comprises a vertical wall at the height of, or taller than, the wall of the evaporation pan. The wave-guard may be attached to adjustable buoyancy floats (hereinafter "floats") at preferably equal spacing surrounding the evaporation pan. In a preferred embodiment, the floats are designed to provide additional buoyancy for the evaporation pan so that the evaporation pan can never sink. The floats preferably have an access port on the top for the addition of weight that is at the same density as, or denser than, the surrounding body of fluid. After the desired freeboard of the wave-guard and evaporation pan are obtained, expanded polystyrene is optionally added to each float to fill in the remaining hollow. The expanded polystyrene preferably provides sufficient buoyancy to prevent the evaporation pan from sinking, even if the integrity of the floats is compromised by penetration of the floats, and filling with the surrounding body of fluid. The evaporation pan is preferably attached to the floats through spacing-braces. These spacing-braces preferably provide an area of calm fluid body surrounding the evaporation pan and add rigidity to the whole apparatus. Preferably, within the evaporation pan itself, there is an adjustable baffle system for the reduction of sloshing and a guided-float for the measurement and control of the fluid level in the evaporation pan.

In one embodiment, the apparatus is preferably anchored in such a manner that its lateral movement is minimized if not eliminated while also allowing for its vertical movement so that the apparatus can move up or down with the level of the surrounding body of fluid. This anchoring system allows the apparatus to be fixed at a known location and prevents its rotation so that any instrumentation installed on the apparatus will not cast a shadow on the evaporation pan. In a preferred embodiment, the anchor system will consist of one or more (e.g., three) mooring systems attached to the spacing-braces around the evaporation pan. Mooring systems are well established in the art and one such system is described herein as an example. A typical mooring system consists of an anchor, to be selected by one skilled in the art, an anchor line connecting the anchor to the buoy on the surface of the fluid, and a pickup line, which connects the buoy to the object being moored.

Figure 2:
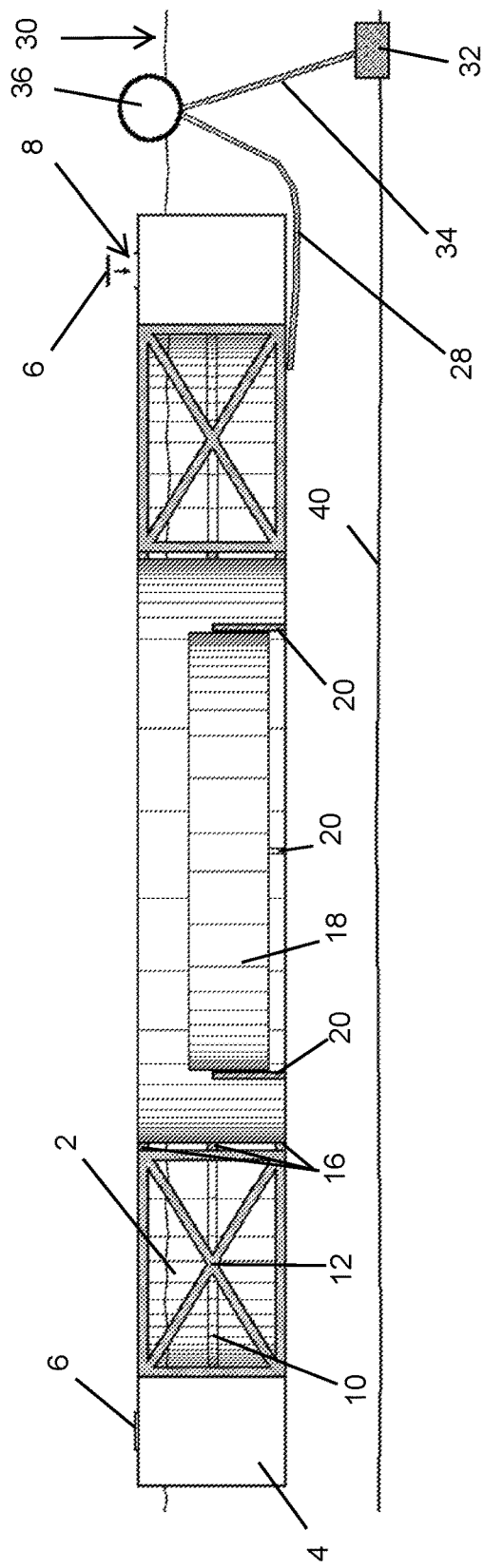
FIG. 2 is a cross-sectional view of the embodiment of FIG. 1.

Referring to FIGS. 1 and 2, in one embodiment, floating evaporation pan system 1 preferably comprises evaporation pan 14, a plurality of wave-guards 2, and a plurality of floats 4 to provide buoyancy for the apparatus to float on the surface 30 of a body of fluid. Each float 4 preferably comprises one removable cap 6 to cover or fit in opening 8. These floats 4 are preferably positioned substantially approximately equidistant from each other and surround evaporation pan 14 to maintain a level operation of the apparatus. Each float 4 is preferably attached to one spacing-brace 12 and to two wave-guards 2. Preferably, spacing-braces 12 attach the outer structure comprising the wave-guards 2 and floats 4 to evaporation pan 14. Spacing-braces 12 preferably provide sturdiness for the apparatus in an environment with wave action and allow a separation between the wave-guards 2 and evaporation pan 14. Additionally, spacing-braces 12 preferably provide a durable location to attach one or more pickup lines 28 for each mooring system. Each wave-guard section 2 is optionally reinforced with one or more wave-guard bracing 10. Wave-guard bracings 10 preferably provide durable attachment points between wave-guards 2 and floats 4.

In one embodiment, evaporation pan 14 preferably comprises bracing 16 attached, for example, to its outer, vertical surface. Bracing 16 preferably provides rigidity for evaporation pan 14. In one embodiment, the uppermost brace 16 comprises a splash guard, which is preferably disposed above the surrounding fluid body level, and further provides a durable location for spacing-braces 12 to attach.

Preferably, within evaporation pan 14 there is a baffle system. In one embodiment, this baffle system comprises baffle 18 and baffle supports 20. Baffle 18 is preferably connected to baffle supports 20, which are preferably adjustable, and are preferably perpendicularly attached to the interior bottom of evaporation pan 14.

The system preferably also comprises a guided-float assembly comprising a plurality of guide-rods 22. In one embodiment, guide-rods 22 are attached perpendicularly to the bottom of evaporation pan 14. The system preferably further comprises guide-tubes 24 that slide over the guide-rods 22. Preferably, guide-tubes 22 are attached to guided-float 26. In one embodiment, guided-float 26 preferably rises and falls with the fluid level within evaporation pan 14 and is preferably attached to a linear displacement measurement device. The type of linear displacement measurement device selected by one skilled in the art is not shown because the type selected may vary, as well as the type of mounting system for such a measurement device.

The mooring system preferably comprises anchor 32 that resides on bed 40 of the fluid body being evaluated. Attached to anchor 32 is anchor line 34 that preferably connects anchor 32 to mooring buoy 36 on the surface of the fluid body. Pickup line 28 preferably connects spacing-brace 12 on the apparatus to mooring buoy 36.

In one embodiment, the apparatus is made of a suitable material (e.g., aluminum or other fluid resistant material) to prevent galvanic corrosion, excluding caps or plugs 6. The construction material should be fluid resistant, durable, and non-reactive to the body of fluid being evaluated.

In describing attachments between the elements herein, any known method of attaching the elements may be employed by one skilled in the art. Examples of attachment methods include the use of drilling holes and employing screws and bolts, using pins and/or adhesives, or using welding techniques.

In operation, the embodiment for an apparatus described above is preferably used as follows. The apparatus is preferably assembled on level land and then moved to the study location once the mooring system is installed. Evaporation pan 14 is preferably filled with fluid from the surrounding body of fluid to a level less than that of the surrounding body of fluid. Floats 4 are preferably then filled with sand until the apparatus is level and at the proper freeboard level. The proper freeboard level is achieved when wave over-topping of evaporation pan 14 is minimized and wind flow disturbance along the surface of body 30 of fluid is minimized. When the desired freeboard and level is achieved, expanded polystyrene is optionally added to the remaining hollow space in each float 4, followed by securing the cap or plug 6 into opening 8 of each float. Finally, the fluid-level within evaporation pan 14 is preferably measured at certain time intervals by one skilled in the art by means of the guided float assembly and the above mentioned linear displacement measuring device, providing the information necessary to calculate the evaporation rate of the body of fluid being evaluated.

INDUSTRIAL APPLICABILITY

The invention is further illustrated by the following non-limiting examples.

Example 1

An apparatus as described above was constructed of marine grade aluminum, 6061-T6 alloy. There were six floats spaced 60 degrees from each other with wave-guard segments attached between the floats. The floats and wave-guards formed a circular-ring surrounding the evaporation pan. The circular-ring shape of the floats and wave-guard aided in the stability of the apparatus and deflected energy imposed on the apparatus from waves in the body of fluid being evaluated. The spacing-braces attached the circular-ring formed by the floats and wave-guard segments to the evaporation pan. The length of the spacing-braces was sufficiently long to prevent splashing on the wave-guards from being ejected into the evaporation pan. Three mooring systems were attached to the bottom of the spacing-braces where the spacing-braces attached to a float approximately every 120 degrees, and each extending outward from the apparatus along the vector formed by the spacing-brace that it was attached to. One mooring system comprised an anchor on the bed of the fluid body being evaluated, an anchor line, a mooring buoy, and a pickup line.

The preceding example can be repeated with similar success by substituting the generically or specifically described components and/or operating parameters of this invention for those used in the preceding examples. Note that in the specification and claims, "about" or "approximately" means within twenty percent (20%) of the numerical amount cited. Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. An apparatus for determining the evaporation rate of an open body of fluid, comprising:
   an open container comprising a vertical wall surrounding the periphery of said open container;
   a baffle system mounted within said open container and said baffle system configured to reduce sloshing of fluid out of the evaporation pan;
   a wave-guard system connected to said open container with spacing-braces, wherein said spacing braces space away said wave-guard system from said open container and comprising wave-guard bracings and a wave-guard vertical wall at least as tall as said vertical wall of said container, said wave-guard system entirely surrounding said open container;
   a buoyancy system; and
   an anchor assembly preventing lateral movement of said apparatus while allowing vertical movement thereof.

2. The apparatus of claim 1 wherein said buoyancy system comprises buoyancy floats surrounding said open container disposed approximately equidistant from each other.

3. The apparatus of claim 2 wherein said wave-guard system connected to said buoyancy floats forms a circular ring surrounding said open container.

4. The apparatus of claim 1 wherein said open container comprises a circular shape.

5. The apparatus of claim 1 further comprising a guided-float assembly comprising one or more guide-rods attached to a bottom surface of said open container, and a guided float.

6. The apparatus of claim 1 further comprising an anchor securing said apparatus at a fixed location within the body of fluid and preventing lateral movement.

7. A method of determining a rate of evaporation of an open body of fluid comprising the steps of:
   providing an evaporation pan;

filling the evaporation pan with the body of fluid to be evaluated;

providing a wave-guard element both extending away from and entirely surrounding the evaporation pan to protect the evaporation pan from waves in the body of fluid;

reducing sloshing of fluid out of the evaporation pan with a baffle system; and measuring the level of the fluid in the evaporation pan at selected time intervals to determine the rate of evaporation of the fluid.

8. The method of claim 7 further comprising attaching adjustable buoyancy floats providing adequate flotation for the evaporation pan.

9. The method of claim 7 further comprising attaching a guided-float assembly within the evaporation pan before filling the evaporation pan with fluid from the surrounding body of fluid.

10. The method of claim 7 further comprising attaching the wave-guard element to the evaporation pan with a plurality of spacing-braces.

11. The method of claim 7 further comprising supporting the wave-guard element by a plurality of buoyancy floats.

12. The method of claim 7 further comprising providing a plurality of anchoring systems preventing rotational and horizontal movement.

13. The method of claim 7 wherein the evaporation pan is filled with fluid from the body of fluid being evaluated to a level less than that of the surrounding body of fluid.

* * * * *